United States Patent [19]

Weilert

[11] 4,431,226

[45] Feb. 14, 1984

[54] LARGE MATTRESS CARRYING DEVICE

[76] Inventor: John K. Weilert, 903 Colborn Rd., Lee's Summit, Mo. 64063

[21] Appl. No.: 322,468

[22] Filed: Nov. 18, 1981

[51] Int. Cl.³ .............................................. B65D 71/00
[52] U.S. Cl. .................................... 294/150; 294/152; 294/153
[58] Field of Search ............... 294/150, 152, 153, 156, 294/149; 190/55 R, 59, 5 T, 58 A, 27; 150/12, 52 R

[56] References Cited

U.S. PATENT DOCUMENTS

| 1,411,175 | 3/1922 | Maquire | 294/150 |
| 2,508,795 | 5/1950 | Nielsen | 294/152 |
| 4,235,355 | 11/1980 | Henry et al. | 294/153 |

Primary Examiner—James B. Marbert
Attorney, Agent, or Firm—Thomas M. Scofield

[57] ABSTRACT

Improvements in large object handling devices, particularly mattress carriers; improved wrap-around band or strap mattress carriers to enable two people to carry large and cumbersome mattresses; variably adjustable wrap-around band and strap mattress carrying and handling devices which are adjustable and useable to fit and carry more than one size of mattress.

24 Claims, 15 Drawing Figures

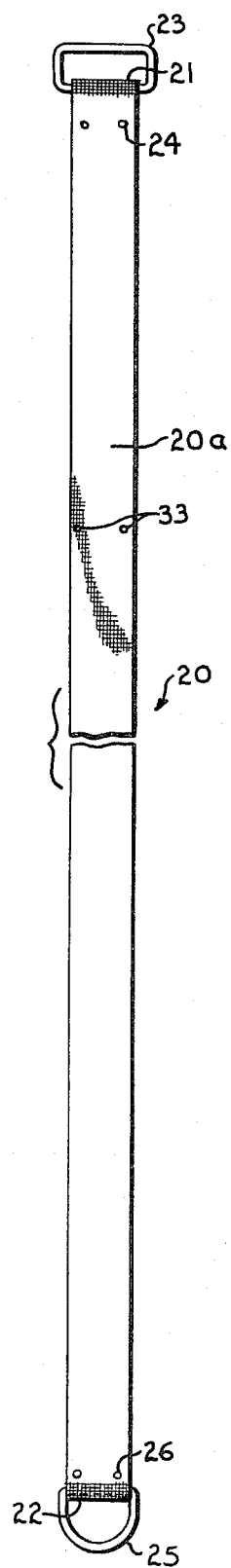
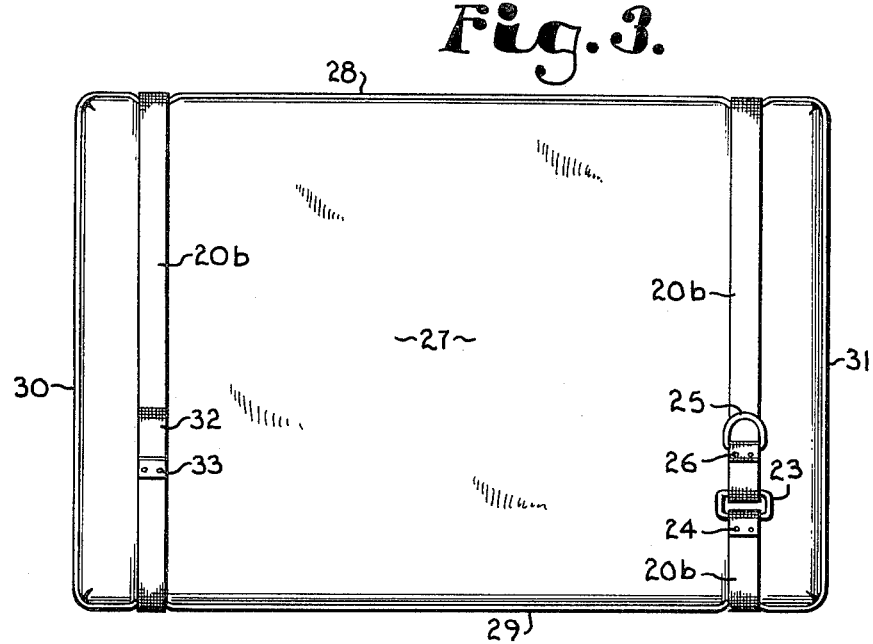
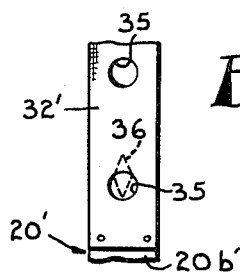
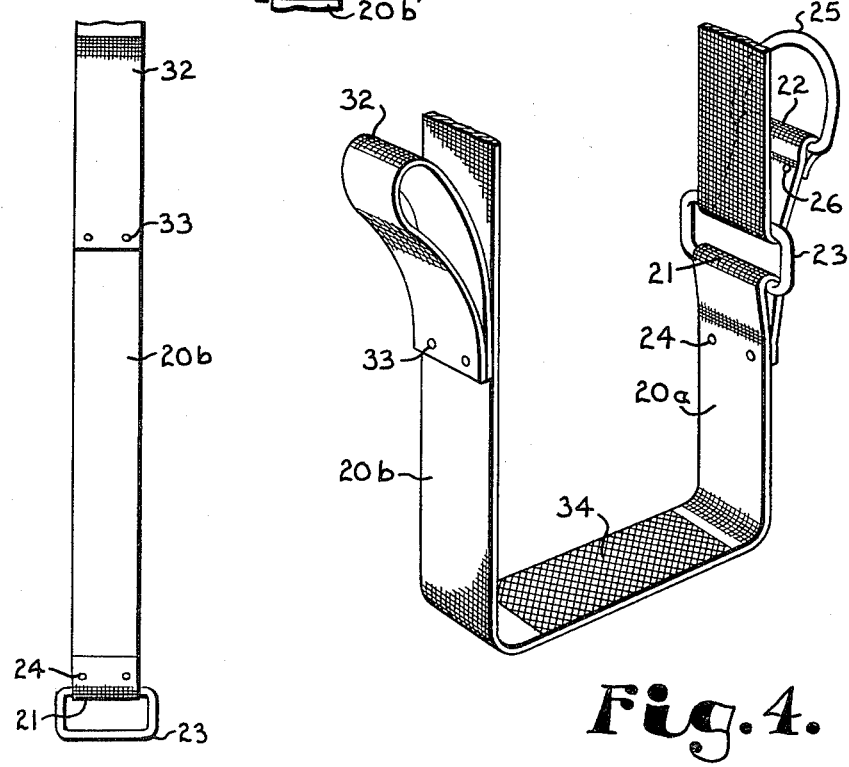

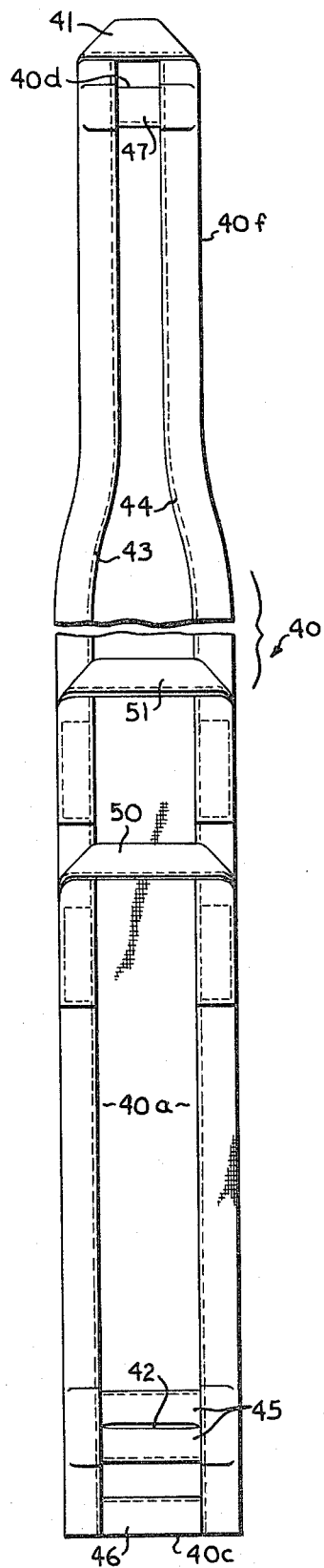
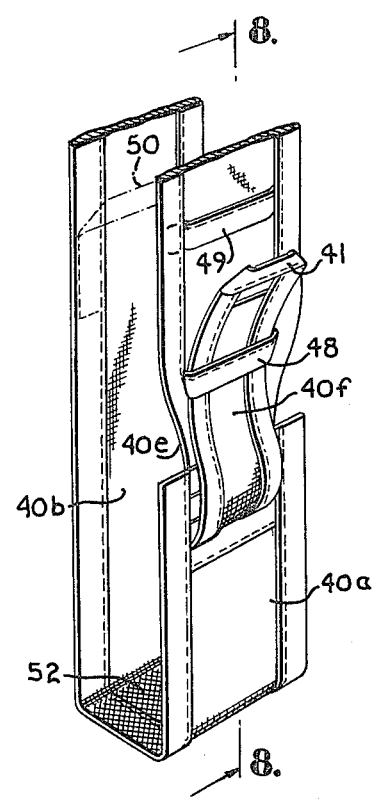
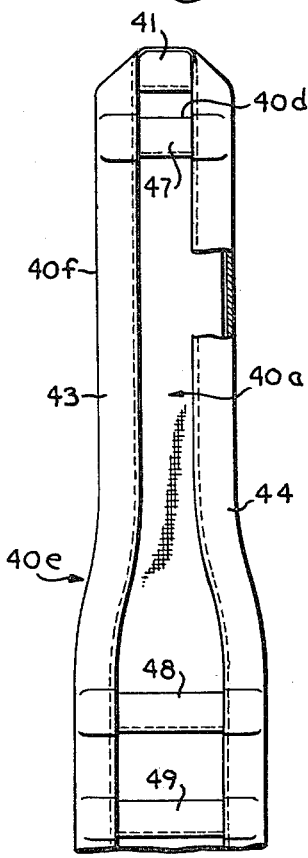
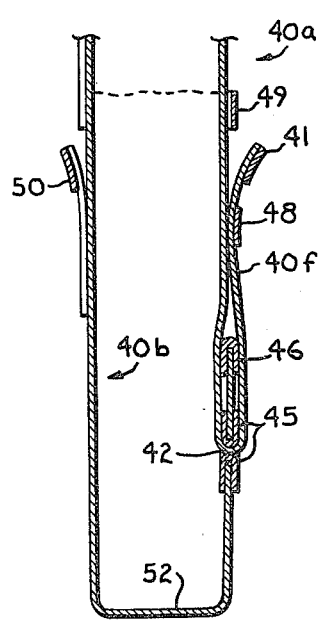
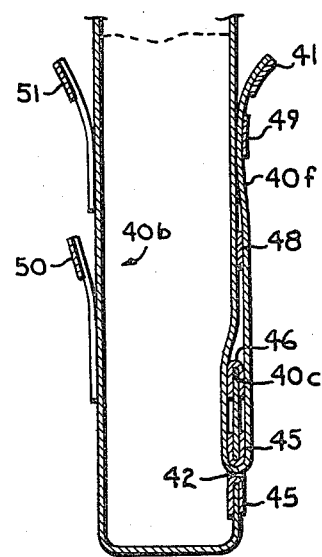

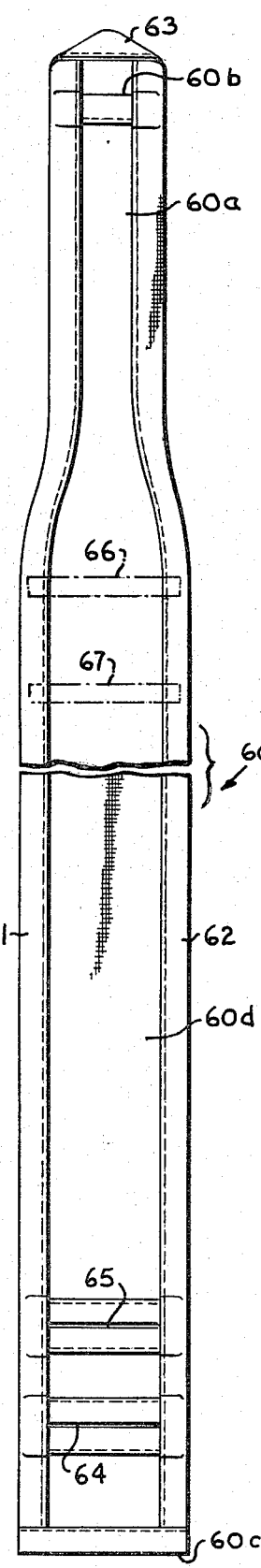
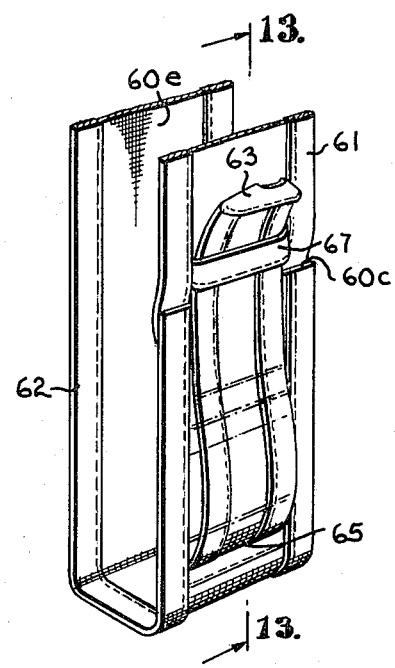
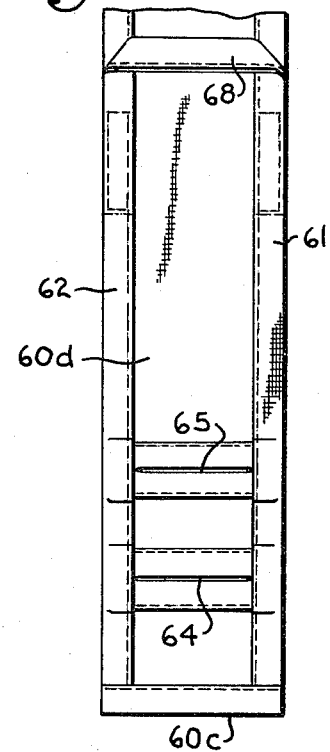
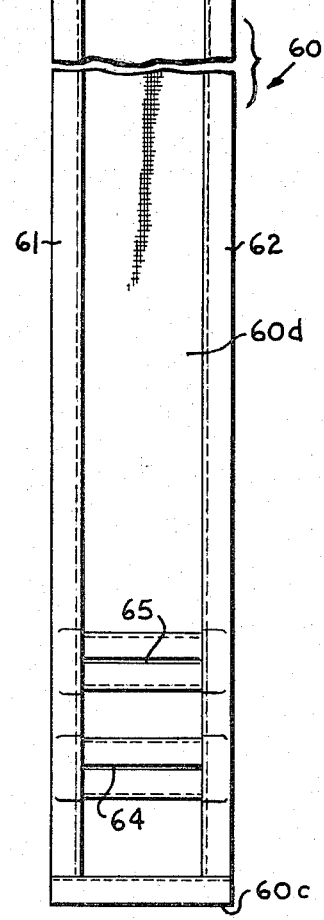
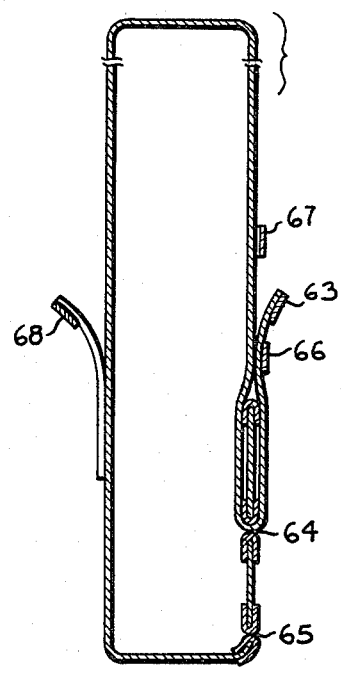

LARGE MATTRESS CARRYING DEVICE

BACKGROUND OF THE INVENTION

Devices including band and strap wrap-around carrying means for lifting, handling and carrying large, heavy, cumbersome and/or awkwardly shaped articles are well known to the art. The problems of handling such objects are known to the very ancient arts. Many attempts have been made to satisfactory solve these problems, including the specific problems of handling mattresses. The latter problem has become more difficult and urgent as mattresses have increased in size (particularly including queen and king size mattresses), thickness, weight and bulk.

Anyone who has attempted to move mattresses from one room to another, from one house or apartment to another or from an interior room to a vehicle and vice versa, knows that:

(1) generally, at least two people must be involved, particularly the larger and more cumbersome the mattress;

(2) the conventional handles (often or sometimes provided by mattress manufacturers on the sides and/or ends of new mattresses) are relatively ineffective (in direct proportion to the size and bulk of the mattress) and, often, they pull out or sometimes even are not present;

(3) single bed size mattresses are generally fairly easy to handle with two cooperating adults, but double and queen size mattresses, to say nothing of king size mattresses, are really very difficult to handle, even for two young, strong, healthy and vigorous individuals.

Movers, whether professional or amateur, in moving bed assemblies, have to handle (1) the bed frame, whatever structure it may be (2) the box springs, if present, and (3) the mattress or mattresses. Generally speaking, the frame may be broken down or, at least is sufficiently rigid that it can be handled as a unit, in whole or part. Box spring, while heavy and cumbersome because of their relatively rigid structure, are usually themselves not too difficult to handle, provided the individuals moving them are strong, etc. enough. With respect to mattresses, however, not only the size, but also the lack of rigidity in the mattress structure particularly make such often extremely difficult to handle.

Typical moves for bed elements are from store or storage areas to vehicles, from vehicle to dwellings, from room to room in dwellings, apartments or the like and the reverse (out of the building and into the vehicle, etc). These moves often involve going up and/or down stairs, through doors, corridors, multiple doors, around turns and and the like. The handling of mattresses can be not only difficult and energy consuming, but also extremely frustrating. Accordingly, various means have been devised in the prior art to attempt to handle these problems. Such means have not proved sufficiently satisfactory that they have been universally adopted. The problem of optimally moving and handling mattresses has not yet been solved. Those problems inherent in grappling, lifting, carrying and handling objects of the mattress size, lack of rigidity, shape, etc. will not go away, and badly need to be solved.

BRIEF DESCRIPTION OF THE INVENTION

The subject invention is directed to a strap or band (one being used at each end of the mattress by one person, so that there is a total of two persons working and two straps or bands used) which wraps around the mattress, grips it tightly and further provides two handles to enable the individuals at the opposed ends to the mattress to carry it on one long edge. The subject device can also be used to carry box springs, although these, as noted, with their inherent rigidity, are generally somewhat more easy to handle than are mattresses.

The essence of the construction is an elongate band or strap having a loop handle at at least one end thereof. At or adjacent the other end of the strap is either another loop (through which the first loop and opposite end thread) or a slot. When this engagement is made around the mattress or box spring, with the free end of the strap pulled through the opposite end loop or slot, one handle is provided. One or more additional loops or handles are provided attached to the outside face of the band or strap and spaced along the strap or band from the engaged end.

When the noted strap or band construction is wrapped around and engaged with itself with respect to a mattress or box spring construction, with a handle on the free end of the strap, such opposed through the mattress with another auxiliary strap handle, as described, a double handed grip may be taken by each operator or carrier at each end of the mattress. With such aid, any size mattress may be carried along or manipulated with considerably greater ease than merely manhandling it without any mechanical aids or utilizing the conventional notoriously ineffective, factory provided handles on the end edges and/or side edges. In use, the longer edges of the mattress are horizontal in carrying position, with the position of the grasping handles preferably being below center or near center of the mattress, depending upon its size.

THE PRIOR ART

Applicant is aware of the following patents specifically directed to mattress carriers or carrying devices:

Welch U.S. Pat. No. 1,579,420, issued Apr. 6, 1926 for "Mattress Carrier";

Bechik U.S. Pat. No. 2,131,211, issued Sept. 27, 1938 for "Handle For Mattresses, Cushions, And The Like";

Caton U.S. Pat. No. 2,399,786, issued May 7, 1946 for "Portable Carrying Device"; and Brutlag U.S. Pat. No. 4,119,250, issued Oct. 10, 1978 for "Mattress Carrying Device".

Applicant is further aware of the following strap or band type devices for carrying either heavy, cumbersome or difficult to handle devices:

Taylor U.S. Pat. No. 858,680, issued July 2, 1907 for "Casket-Shipping Strap";

Lundquist U.S. Pat. No. 1,824,927, issued Sept. 22, 1931 for "Hoisting Sling";

Baston, et al. U.S. Pat. No. 3,268,134, issued Aug. 23, 1966 for "Ski Carrier";

Foley U.S. Pat. No. 3,933,287, issued Jan. 20, 1976 for "Book Strap";

and

Miller U.S. Pat. No. 4,156,498, issued May 29, 1979 for "Carrier For Framed Art Works".

OBJECTS OF THE INVENTION

A first object of the invention is to provide improved devices and means for lifting, handling and carrying mattresses and box springs.

Another object of the invention is to provide new and improved band or strap wrap-around devices for engaging the opposed ends of a mattress, a box spring or like large, unwieldy and cumbersome objects and permitting the lifting, handling and carrying of same by two individuals in cooperation in greatly facilitated and improved manner.

Another object of the invention is to provide improved strap or band wrap-around, engaging devices for lifting, carrying and handling large, unwieldy and cumbersome objects, particularly including mattresses and box springs, wherein the devices have adjustability to accommodate more than one size of mattress or box spring.

Another object of the invention is to provide such devices of the character described which are simple in construction rugged, durable, easily applied, easily used, easily removed and easily and conveniently stored.

Another object of the invention is to provide devices of the character described which are readily useable (without special skills or training) by either professionals or amateurs in the lifting, carrying, handling and moving of large and cumbersome, unwieldy objects, particularly considering mattresses and box springs, which devices are relatively simple and cheap to manufacture or fabricate and have a long life in spite of active and continued use.

Another object of the invention is to provide such engaging, gripping, lifting, carrying and handling devices of the character described, which devices securely and firmly grip the object to be manipulated and permit secure, convenient, minimum strain and safe use by individuals of normal size and strength.

Another object of the invention is to provide improved devices of the character described wherein the lifting and support means for the object being carried by the operators or users operates to maintain the device in tight gripping and service engagement with the object being carried, thus avoiding and preventing slipping or disengagement of the carrying devices from the object being carried, despite the usual changes of direction, angle, velocity and push-pull happenstances that occur in the handling and moving of large, unwieldy and cumbersome devices by two individuals. This insures that the carrying devices will not have to be reapplied or reinstalled in unpleasant, cramped or close quaters, on a winding staircase or the like.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIGS. 1-4, inclusive are directed to the simplest form of the subject invention, specifically, a mattress or work object encircling strap or band having at the engaged ends thereof, a simple pull through loop handle with an opposing grasping handle fixed to and spaced along the strap therefrom.

FIG. 1 is a plan view of one side of the device of FIGS. 1-4, inclusive, specifically, the inside, or that side which is next to the work object or mattress to be carried.

FIG. 2 is a fragmentary view of the upper portion of the device of FIG. 1 showing the opposite side thereof with the auxiliary gripping handle thereon.

FIG. 3 is a side elevation of the mattress engaged by two of the devices seen in FIGS. 1, 2 and 4, with the pull-through gripping handle showing on the application at the right hand side of the mattress and the fixed auxiliary handle showing on the application at the left hand end of the mattress.

FIG. 4 is an enlarged, fragmentary section of the lower portion of the device of FIGS. 1-3, inclusive, when applied to a mattress or work piece, showing the two handles in opposed, gripping and engaging position.

FIG. 4(a) is a fragmentary view of a portion of the outer surface of a band like that seen in FIGS. 1-4 inclusive, the view like the top end of FIG. 2, showing a variation where the auxiliary handle on the strap is variably attachable thereto.

FIGS. 5-9, inclusive show a form of the invention wherein a broader band is employed in the main body of the device, there being a single slot provided at one end (in the enlarged or greater width portion of the device), while two fixed handles are provided on the outside surface of the device opposed thereto, thereby to provide adjustability for different sizes of mattresses.

FIG. 5 is a plan view of the device of FIGS. 5-9, inclusive from the outer side when applied to the work object.

FIG. 6 is an enlarged view of the upper end of the device of FIG. 5, but extending downwardly further on the structure to show the engaging loops for the free end handle. It may be noted that the top loop in this view is reversed from the showing of FIG. 5 (to no particular purpose but showing the resiliency of the material).

FIG. 7 is a three-quarter perspective view of the device of FIGS. 5-9, at the lower end thereof when such is engaging a work piece or mattress showing the device adjusted to engage the largest size mattress possible (free end handle passing through the lower pull-through loop). (It is specifically noted that this figure shows the equivalent of the device of FIGS. 1-4, inclusive with there also being a free end loop engagement).

FIG. 8 is a view taken along the line 8-8 of FIG. 7 in the direction of the arrows.

FIG. 9 is a view like that of FIG. 8, but showing the smaller mattress size adjustment with the free end of the band or strap engaging the upper pull-through loop.

FIGS. 10-14, inclusive illustrate a form of the device having two slots adjacent one free end of the device, such alternately engageable by the other free end of the device, there being but a single opposed handle fixed to the band or strap itself.

FIG. 10 is a plan view of the device of FIGS. 10-14, inclusive extended, this view showing the inside surface thereof with respect to a work piece or mattress to be engaged.

FIG. 11 is a fragmentary view of the bottom portion of the device of FIG. 1 showing the reverse (or outside) thereof and the permanent grasping handle thereon in its spaced relationship to the two slots adjacent the one free end of the device.

FIG. 12 is a three-quarter perspective view of the lower portion of the device of FIGS. 10-14, inclusive in the position it would assume while engaging a work piece or mattress, the device illustrated in the arrangement or end engagement adapted for use on a relatively smaller size mattress.

FIG. 13 is a view taken along the line 13-13 of FIG. 12 in the direction of the arrows showing the same in a slightly different perspective.

FIG. 14 is a view like that of FIG. 13, but showing the device in the arrangement for use on the larger size mattress with the upper slot adjacent one free end of the device being engaged by the other (handled) free end of the device and the lower engaging loop being employed by that handled end.

FIGS. 1-4, INCLUSIVE

Referring first to the construction seen in FIGS. 1-4, inclusive, these figures show a lifting, carrying and handling device (typically used in pairs) for large and cumbersome work objects, particularly bed mattresses. In the specific embodiment shown, there is provided an elongate, substantially rectangular band 20 having an inside (with respect to the work object to be handled, etc.) face 20a and an outside face 20b. The band has opposed, substantially parallel side and end edges, the side and end edges extending at substantial right angles to one another. There are two free ends to the band, such designated 21 and 22.

Ring means 23 are positioned adjacent one first, free end 21. Here such comprise a substantially rectangular hollow member 23 which is received and fixed in a loop at end 21 and secured by studs or rivets 24. At the other free end of the band strap 20, positioned adjacent thereto, is primary handle means 25. This specific handle means comprises an arcuate metal loop 25 having a flat base, the latter fixed in a free end 22 loop and secured by studs or rivets 26. Since ring 23 and handle means 25 are rigid metal in the example shown, the width of ring means 23 is greater than that of handle means 25. When the handle 25 is passed through ring 23, as seen in FIG. 4 (as well as in the lower right hand corner of FIG. 3) a continuous loop of band 20 provided which is able to surround a portion of the work object with the primary handle means 25 and a portion of the band next thereto extending through ring means 23.

In the showing of FIG. 3, this improvement is shown in application to a large double, queen size or king size mattress 27 having long side edges 28 and 29 and shorter end edges 30 and 31. In the view of FIG. 3, a first application of the device is made adjacent of the left hand end 30 of mattress 27 with the portion of the device which is to the left in FIG. 4 visible in the lower left hand corner. In the second application of the subject device adjacent the right edge 31 of mattress 28, the portion of the device shown in the right hand side of FIG. 4 is seen in the lower right hand corner of the mattress, but looking from right to left in the view of FIG. 4. It should be kept in mind that the strap 20 in question may be in the range of 12 feet in length (less for smaller mattresses than queen size and more for king size mattresses, typically).

At least one secondary handle means 32 is fixed to the outer face of said band adjacent to but spaced along the band from the free end 21 thereof carrying ring means 23. In the form shown, assuming a leather or fabric bank or belt 20 (strap), handle 32 comprises a fabric, leather, or the like strap folded upon itself and fixed to the outside surface of the band by rivets or studs 33. Handles 25 and 32 are grasped by one individual (after the strap has been looped around the work object and the one free end engaged to the other) so as to both constrict or tighten the band 20 on the work object and serve as lifting means to apply lifting force to the mattress or work object through band 20.

On the inside surface 20a of band 20 adjacent free hand 21 and ring means 23, there is preferably provided a colored or marked zone 34 which is useable to locate the inside surface 20a of band, strap or belt 20 with respect to the lower edge 29 and the mattress or other work object to symmetrically space the handles 32 and 25 from one another. It is specifically noted that, in the construction seen in FIGS. 1-4, inclusive, the device in question is essentially suited only to work with (most conveniently) a work object of a single given size, such as one mattress size (for which the length of the band must be regulated). That is, for optimum use of the device in question without any retaining loop (see the remaining figures after FIG. 4) for the free end 22 after it engages the ring means 23, or several such, if the length of the free end 22 past ring means 23 becomes too great, then lifting, handling and carrying efficiency is greatly reduced. Additionally, if varying lengths of the free end 22 past ring means 23 are contemplated with respect to differing size work objects, then a plurality of secondary grasping handles 32 must be provided or, alternatively, a variably adjustable or engageable single secondary grasping handle as seen in FIG. 4a.

Referring to FIG. 4a, on the outer face of belt 20' there is provided a plurality of button type studs 35, same spaced apart and fixed to the length of the other surface 20b' of belt 20'. Grasping handle 32' is an enclosed loop fixed to itself at one end and having a slot 36 engageable with the several studs 35 one at a time to provide a variable adjustment of the handle along the lines of the band.

The construction of FIGS. 5-9, inclusive (particularly see FIGS. 7-9, inclusive) in effect shows the construction just described where a plurality of retaining loops for the free end 22 and a plurality of fixed grasping handles are provided. This construction will be described with respect to this configuration.

FIGS. 5-9, INCLUSIVE

In these figures, therein is shown a modification of the invention which is utilizable with two different sizes of work objects, particularly, two mattresses of a different size. This is accomplished by using but a single ring means at the one free end of the band, strap or belt, while providing two spaced, secondary handles along the length of the outer face of the belt. Additionally, a plurality of retaining loops for the opposite free end of the band or belt are provided. Yet further, the ring means is provided integrally of the belt (in the form of a slot) and the opposite end of the band, belt or strap is (optimally) of lesser width so as to readily slide or fit through the slot.

Referring, then, to FIGS. 5-9, inclusive, therein is shown an elongate band, belt or strap generally designated 40 having an outer face 40a and an inner face 40b. This strap has one free end 40c and another free end 40d (the latter having grasping handle 41 thereon). The former has slot 42 formed through the strap closely adjacent thereto. The construction of the device shown in these views is of cloth material (such as burlap) for lightness, cheapness, foldability, storability, etc. and the device is shown with various reinforcements. Thus, the edges of the strap (longitudinal edges) are each continuously embraced by continuous reinforced edges 43 and 44 fastened by stitching or other means. Slot 42 is cut through band 40 but additionally provided with edge overlying reinforcements 45. In like manner, free ends 40c and 40d are preferably provided with reinforcing overlying end pieces 46 and 47.

Referring particularly to FIGS. 6-9, inclusive, a pair of retaining loops 48 and 49 are provided intermediate the ends of band 40, but closer to end 47. These loops are preferably positioned adjacent lesser width band portion 40e, past neckdown zone 40e. The ends of first and second retaining loops 48 and 49, respectively, are conveniently received under and secured with reinforcing portions 43 and 44. They must be of sufficient free width to receive the lesser width end of the band at 40f thereunder as is seen in FIGS. 7-9, inclusive. Cloth bands may fold or crumple upon themselves to permit such fit through.

There are additionally provided, on the outer surface 40a of band, strip or strap 40, first and second retaining handles 50 and 51 which are stitched or otherwise fixedly attached to the band portions 43 and 44 in the greater width portion of band 40. The spacing of these handles, combined with the spacing of retaining loops 48 and 49, as well as the positioning of slit of slot 42 and the length of reduced width portion 40f are such that, when the lesser width portion 40f is threaded through slot 42 and handle 41 taken through first retainer loop 48 (see FIGS. 7 and 8), the handle 41 and 50 are symmetrically positioned with respect to a standard mattress circumference for a greater size mattress (typically queen or king size). In this regard, additionally, there is provided an orienting patch, signal or indicator 52 on at least the inside surface 40b of band 40 (as seen in FIG. 7). This is also seen (and is optional) on the outer side of the band 40 in FIG. 5.

The alternative sizing of the mattress gripping device, for a relatively smaller size mattress, full or queen size, is seen in FIG. 9. In that view, it is seen that the lesser width end 40f is threaded entirely or almost entirely through slot 42, with the handle 41 engaged under and past secondary retaining loop 49. In this arrangement, the handle 41 is opposed to and symmetrical with secondary grasping handle 51. The bottom portion of the band 40 (to be positioned under the mattress edges) may be marked with a different patch of color (not seen in any of the views) for orientation purposes in such use. Such must be distinguishable from patch 52.

In a specific application of the just described device for standard size double and queen size mattress, the length of the band, from end 40c to end 40d may optimally be 12 feet 1 inch. The spacing of slit 42 from end 40c may optimally be 5 inches. The spacing of handles 50 and 51 from end 40c may optimally be 37 and 47½ inches. The spacing of retaining loops 48 and 49 from end 40d may optimally be 28 and 33½ inches. The width of the greater width portion of the band may be 9½ inches and the width of the lesser width portion 40f of the band may be 6½ inches. The center of the patch 52 from end 40c may be 15½ inches. These measurements, as given, are taken from a working model of the device of FIGS. 5-9, inclusive adapted to engaging, lifting, carrying and transporting standard full and queen size mattresses. Lengths will differ for a device adapted to queen and king sizes, as well as positions of the elements, etc. That set or pattern given is for example only and not limiting.

In actual use, typically, the mattress will by lying on a flat surface on one side thereof. Assuming the mattress is queen size, the use of patch 52 may located the two bands with respect to one edge of the mattress. The devices are then looped around the mattress and the engagement of FIGS. 8 and 7 is accomplished, specifically, end handle 41 is threaded through slot 42 and engaged with retaining loop 48 so that handles 41 and 50 are in alignment. Once this engagement is made and the band cinched tightly about the mattress, it may be raised up on edge and then carried by the two handles on each band to whatever ultimate location is required. Once there, the mattress is laid on the side desired and the devices disengaged from themselves and removed from the mattress. In use, typically, though not necessarily, the holder, user or operator will face the end of the mattress and abut the mattress with his chest or shoulder.

FIGS. 10-14, INCLUSIVE

This showing varies from that of FIGS. 5-9, inclusive in illustrating a device with (1) the broad-narrow band configuration, (2) two ring means, slits or slots instead of the single such seen in the previous described modification, (3) the provision of a pair of retainer loops as seen in the last modification and (4) the provision of but a single secondary handle on the device. This modification is preferred over that of FIGS. 5-9, inclusive, each being workable and operable as illustrated and described.

In these figures, the band is generally designated 60 having a lesser width portion 60a at one end thereof with the ends being indicated at 60b and 60c. As in the case of the previous modification, if the construction is of cloth, the side edges may have folded over and sewn on reinforcement strips as at 61 and 62. The outside (away from the work) face of the device is numbered 60d and the inside face thereof 60e. End 60b has handle 63 thereon and slits or slots 64 and 65 are provided adjacent end 60c but spaced therefrom. In a clot modification the ends preferably have reinforced edges, as seen, here unnumbered.

There are provided first and second retaining loops 66 and 67 on the outer face of the band adjacent the end 60b but positioned in the flared or enlarged width portion of the band. A single secondary handle 68 is provided on the outside face of the bank adjacent to but spaced from slots 64 and 65, as seen in FIG. 11. The edging 61 and 62 of band 60, as is the case in FIGS. 5-9, inclusive is preferably an extra strip of material which is folded over the edge of the bank 60 and stitched thereon. The end pieces 60b and 60c may be received within the side edge strips or overlie them. Likewise, the retainer loops 66 and 67 may be received at their ends within reinforcing bands 61 and 62 or overlie same to be stitched thereover.

In a specific example of the device in question, adapted to handle queen and full size mattresses, the length of the device between ends 60b and 60c is optimally 146 inches. The distance of queen size and full size slots 64 and 65 from end 60c are 7½ and 13½ inches, respectively. The distance of handle 68 from end 60c is optimally 41 inches. The distances of retainer loops 66 and 67 from end 60b are, respectively, 27½ and 34½ inches. The widths of the wide and narrow portions of the band may be the same as previously given with respect to FIGS. 5-9, inclusive. Colored patches for portions of the inside band surface (optionally going through to the outside) may be provided to aid positioning portions of the band with respect to the side edges of the mattress sizes indicated (not seen).

In use, with respect to the lesser size mattress, the lesser width end 60a and handle 63 are threaded through the further slot 65 and then handle 63 through further retainer loop 67. This is seen in FIGS. 12 and 13. In this arrangement, handle 68 will oppose, symmetrically, handle 63.

When it is desirable to engage a larger size mattress, handle 63, end 60b and portion 60a are threaded through nearer slot 64 (to end 60c) as seen in FIG. 14 and the nearer retainer loop 66 (to end 50b). In this arrangement, also, handle 68 will be symmetrically opposed to handle 63 as is seen in the view.

The application in use is the same as with respect to the previously described device, specifically, the inner face of the device is wrapped against the flat mattress and the smaller width handle end engaged through one of the slots, as described with respect to this modification, depending upon the size of the mattress. It is then passed through the appropriate retainer loop. The device is adjusted on the mattress so the primary handle 63 and secondary handle 68 are symmetrically opposed to one another, with respect to both end applications and the wrap-around applications cinched tight on the mattress. The mattress is then stood on edge with the engaging handles adjacent the lower edge. Again, the operators, users or workers optimally face the ends of the mattress, abutting same with their shoulder or chest. The mattress may be lifted, carried, manipulated or handled as desired, with the weight of the mattress reinforcing the cinch and engagement, as well as tightness of the band on the mattress, as is the case in the previously described devices.

GENERAL REMARKS

It should be noted that the strap configuration of FIGS. 1-4, inclusive can be employed, alternative to the different width band or strap construction of the remaining figures in the configurations of the later described modifications. In such case inset rings may replace slots or slits in cloth. Individual straps may be tailored to the sizes of individual mattresses. Alternatively, there may be provided a plurality of ring engagements for the free end handle (or slot alternatives), as well as one or more retaining loops for the free end handle and one or more secondary handles. The devices of all the figures may be employed without the retainer loops, if desired. However, when retainer loops (as illustrated in the views) are not employed, with resultant long extensions of the free end handle past the slot or ring engagements on the free end of the strap or band, handling, carrying and manipulating of large work objects like mattresses is very difficult, as the arm and hand of the operator may be required to angle far out from the side of the mattress or work object as it is handled. Once any substantial extension of handle portion 22 (FIG. 4) is encountered past a ring or slot engagement as at 23 in FIG. 4, then a retainer loop as seen at 48 or 49 in FIGS. 5-9, inclusive or 66 and/or 67 in FIGS. 10-14, inclusive is preferred. The engagement of FIGS. 7 and 8 is equivalent to the engagement of FIG. 4 with a single retainer loop positioned thereat. This is also true of FIG. 14.

With respect to FIG. 3 of the drawings, it perhaps should be noted that this showing is probably not how the straps would appear on a mattress in actual usage, i.e., handle means 25 would typically appear at both the left and right ends of the mattress. Since the straps would ordinarily be applied while the mattress is lying flat on the box springs, the users, handlers or operators typically would find it much easier to manipulate handle means 25 through loop 23 on the top side of the mattress. Thus, one user or handler would grasp handle means 25 with his right hand and handle means 32 with his left hand, while the other user or handler would position himself vice versa. The showing of FIG. 3 is incorporated because it portrays the appearance of each side of the strap when actually applied to a mattress, and, further, is a configuration that would be employed in certain circumstances.

As stated, the construction of FIGS. 10-14, inclusive is preferred over that of FIGS. 5-9, inclusive. Experience with actual devices of the structure illustrated demonstrates that the straps are generally more effective and comfortable to use if the handles are positioned nearer to the weight bearing edge than to the top of the mattress (typically about 18 inches from the weight bearing edge is most desirable). In the device of FIGS. 10-14, inclusive, handles 68 and 63 remain a constant distance from the weight bearing edge, even when adjusted to different size mattresses. In the construction of FIGS. 5-9, inclusive, on the other hand, the user's or handler's grip will necessarily be at varying distances from the weight bearing edge (depending upon the size of the mattress being carried). This has a consequent effect on user convenience and comfort.

It has previously been remarked that the strap configuration of FIGS. 1-4, inclusive can be employed as an alternative to the different width and configuration band or strap constructions of the remaining figures. Alternatively, the band or strap constructions or structures seen in the modifications of FIGS. 5-14, inclusive can be adapted to the configuration of FIGS. 1-4, inclusive. By this it is meant that cloth handles and slits can be substituted for the ring handle and loop.

Further with respect to the advantages of employing the retainer loops of the later figures, these loops additionally serve to keep the straps positioned taut and intact while the users or handlers are temporarily removed or away from the mattress. For example, the mattress can be placed in a moving van, leaning on edge, with the straps left applied, and be ready for instant handling and carriage on arrival at destination. Without such retaining loops, the handle on the free end is more apt to slip back out through the engaging loop or slit.

There does not appear to be any fixed, required or specification industry standard of mattress thickness. According to investigation, by actual measurement and examination of various catalog specifications, average mattress thicknesses would appear to be approximately six to seven inches. This thickness seems to be consistent in full, queen and king sizes. At the very least, the measurement range appears to be typical.

Fixed size straps may be difficult to use with box springs. It is questioned as to whether there are industry standards on box springs, but experience would appear to indicate that box spring are typically larger in thickness dimension than mattresses. Box springs, however, are typically lighter in weight and more rigid and thus are not particularly difficult to transport manually, per se.

With respect to providing a movably adjustable secondary handle on the construction of FIGS. 1-4, inclusive, together with a number of retaining loops, such construction would accommodate different size mattresses. The movable or movably adjustable secondary handle could be the FIG. 4a construction. With respect to dimensions, a full size mattress is, typically, 54 inches wide, queen size being typically 60 inches and king size typically being 72 inches wide. Allowing for a seven inch thickness, the overall length of a strap (not counting the end handle) would be 158 inches just to fit around the largest size mattress.

With respect to the constructions seen in FIGS. 5-9, inclusive and 10-14, inclusive, differently placed edge location patches for different size mattresses are not needed. The more or less parallel placement of the opposing handles on the adjustable strap is accomplished in reference to the single colored patch placed on the edge of the mattress. By varying the location of the patch, one would have to rearrange handles. Further, multiple edge patches would confuse the user or handler.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A device for carrying a large work object or mattress of basically two sided rectangular construction with two substantially parallel, opposed end edges and two substantially parallel, opposed side edges, the end and side edges extending substantially normal to one another, the end edges equal to or lesser in length than the side edges, the work object or mattress to be normally carried in substantially vertical orientation with one side edge down in substantially horizontal orientation (when the object is being carried across a substantially horizontal surface) and the end edges in substantially vertical orientation, with one carrier typically positioned at each end edge of the work object utilizing one of the subject devices to lift, carry and handle his/her end and adjacent work object portions thereto, said device comprising, in combination:

(1) an elongate, substantially rectangular band having opposed, substantially parallel side and end edges at substantial right angles to one another, an inside and an outside face with respect to the work object or mattress and two free ends,
   (2) ring means fixed to said band and positioned closely adjacent one first free end thereof and primary handle means fixed to said band and positioned closely adjacent the other, second free end thereof, the primary handle means and second free end, as well as at least some length of the band next to said primary handle, able to pass through said ring means, whereby to provide a continuous loop of said band normally positioned vertically around a portion of said work object or mattress somewhat adjacent one vertical end edge thereof and extending substantially parallel thereto with the ring means positioned substantially below center height of said vertical mattress on one side thereof with the primary handle means and a portion of said band next thereto engaging and extending through said ring means in reversed, upward grasping orientation and
   (3) at least one secondary handle means fixed to the outer face of said band on the opposite side of said mattress from said ring means and primary handle means also in an upward grasping orientation, as well as being spaced upwardly from the lower side edge of the object a substantially equal distance to the position of said primary handle means whereby, when the carrier at that end of the work object or mattress grasps (with separate hands) the primary handle means and the secondary handle means and exerts lifting force upon both thereof, the said handles being substantially symmetrically spaced both apart from one another and from the lower side edge of the said object, the said lifting force exerted by the separate hands of the carrier simultaneously constricts the band on and around the engaged portion of the object and exerts lifting force upwardly thereon through the lowermost portion of said band while permitting the additional engagement of the opposed sides of the work object or mattress with the user's hands, wrists, forearms and upper arms and, as well, enables the carrier to lean his/her chest or shoulder against the adjacent vertical end edge of the work object or mattress for handling, moving and stabilizing purposes.

2. A device as in claim 1 wherein there are more than two secondary handle means on the outer face of said band fixed thereto in an upward grasping orientation, such spaced apart from one another on said band to enable handling of different size work objects and mattresses.

3. A device as in claim 1 wherein the secondary handle means is removably attachable to the outer face of the band at a plurality of positions therealong in order to enable lifting, handling and carrying of different size work objects and mattresses.

4. A device as in claim 1 including a plurality of ring means on said band, said ring means positioned adjacent to but spaced apart from one another along the length of said band, in order that the primary handle may alternatively be engaged therewith to enable the engaging, lifting, handling and carrying of different size work objects and mattresses.

5. A device as in claim 4 wherein at least one of the ring means comprises a slot through said band.

6. A device as in claim 1 wherein the ring means and primary handle means are positioned at the respective first and second free ends of the band and each comprises a separate loop of material fixed to said band ends.

7. A device as in claim 1 wherein the first free end portion of the band carrying the ring means is of greater width than the second free end portion of the band and the primary handle means.

8. A device as in claim 7 wherein said ring means comprises a slot in the band adjacent the first free end of the band.

9. A device as in claim 7 wherein the ring means comprises two slots in the band each positioned adjacent the first free end of the band, but spaced apart from one another.

10. A device as in claim 1 wherein the portion of the band extending between and carrying the ring means and the secondary handle is of greater width than the second free end portion of the band and the primary handle means.

11. A device as in claim 10 wherein there are two secondary handles and the portion of the band carrying both of them is also relatively wider than the second free end portion of the band and the primary handle means.

12. A device as in claim 1 wherein the ring means comprises two slots in the band, the slots both positioned adjacent the first free end of the band, but spaced apart thereon from one another, and the portion of the band extending therebetween and carrying the ring means and the secondary handle is of greater width than the second free end portion of the band and the primary handle means.

13. A device as in claim 1 wherein the ring means comprises one slot in the band adjacent the first free end of the band, the portion of the band extending between and carrying the ring means and secondary handle is of greater width than the second free end of the band and the primary handle means and the secondary handle means is removably attachable to the outer face of the band at each of a plurality of fixed positions therealong.

14. A device as in claim 1 including a first retaining loop on the outer face of said band positioned adjacent the second free end of the band having the primary handle means thereon, said loop adapted to receive the primary handle means and a portion of the band adjacent thereto therethrough after the latter have engaged the ring means, whereby to limit the extension of the primary handle away from the band and aid in lifting, handling, carrying and supporting said work objects.

15. A device as in claim 14 including at least a second retaining loop on the outer face of said band adjacent to but spaced away from the first mentioned retaining loop on said band adapted for engagement by the primary handle and for the same noted purposes.

16. A device as in claim 15 wherein there are two ring means on said band, said ring means positioned closely adjacent the second free end of the band yet spaced apart from one another along said band.

17. A device as in claim 1 including a pair of retaining loops fixed to the outer face of said band adjacent the second free end of said band bearing said primary handle means, each loop adapted to alternatively receive therethrough said primary handle means and a portion of said band adjacent thereto, there also being a second secondary handle means on the outer face of said band spaced apart on said band from said other, first secondary handle means.

18. A device as in claim 1 including a pair of retaining loops fixed to the outer face of said band adjacent the end of said band carrying said primary handle means, said retainer loops adapted to receive alternatively therethrough said handle means and a portion of the band next thereto, the secondary handle means on said band being variably positionable therealong at a plurality of fixed positions thereon.

19. A device as in claim 1 wherein there are two secondary handles on the outer face of said band fixed thereto in a upward grasping orientation, such spaced apart from one another on said band, the ring means comprising two slots in the band, the slots both positioned adjacent the first free end of the band, but spaced apart thereon from one another, the portion of the band extending therebetween and carrying the ring means and the secondary handles being of greater width than the second free end portion of the band and the primary handle means.

20. A device as in claim 19 including a first retaining loop on the outer face of the said band positioned adjacent the second free end of the band having the primary handle means thereon, said loop adapted to receive the primary handle means and a portion of the band adjacent thereto therethrough after the latter have engaged the ring means, whereby to limit the extension of the primary handle away from the band and aid in lifting, handling carrying and supporting said work object.

21. A device as in claim 20 including at least a second retaining loop on the outer face of said band adjacent to but spaced away from the first mentioned retaining loop on said band adapted for engagment by the primary handle and for the same noted purposes.

22. A device as in claim 1 wherein there is but a single secondary handle means attached to the outer face of the band, the ring means comprising two slots in the band, the slots both positioned adjacent the first free end of the band, but spaced apart thereon from one another, and the portion of the band extending therebetween and carrying the ring means and the secondary handle being of greater width than the second free end portion of the band and primary handle means.

23. A device as in claim 22 including a first retaining loop on the outer face of said band positioned adjacent the second free end of the band having the primary handle means thereon, said loop adapted to receive the primary handle means and a portion of the band adjacent thereto therethrough after the latter have engaged the ring means, whereby to limit the extension of the primary handle away from the band and aid in lifting, handling, carrying and supporting said work objects.

24. A device as in claim 23 including at least a second retaining loop on the outer face of said band adjacent to but spaced away from the first mentioned retaining loop on said band adapted for engagement by the primary handle for the same noted purposes.

* * * * *